United States Patent Office 3,428,808
Patented Feb. 18, 1969

3,428,808
DEVICE FOR DETECTING RADIOACTIVE CONTAMINATION OF A SURFACE
Stanislas Cottignies, Bagnols-sur-Ceze, France, assignor to Commissariat a l'Energie Antomique, Paris, France
Filed Dec. 6, 1965, Ser. No. 511,635
Claims priority, application France, Dec. 10, 1964, 998,238
U.S. Cl. 250—83.6    3 Claims
Int. Cl. G01t 1/18

ABSTRACT OF THE DISCLOSURE

The radioactive contamination of a surface is determined by sweeping each portion of the surface by a series of detectors in turn and by measuring and adding the radiations detected successively by each detector over a same portion of the surface.

---

The present invention relates to a method for detecting the radioactive contamination of a surface and a device for the practical application of said method.

The device according to the invention is designed for the purpose of monitoring either by means of mobile detectors the radioactive contamination of large stationary surfaces and especially road surfaces or for the purpose of monitoring by means of stationary detectors the radioactive contamination of large moving surfaces, especially of materials such as radioactive ores or contaminated materials placed on a band conveyor.

In order to monitor surface contamination such as that of roads, for example, the usual methods make it necessary to employ a detection probe unit which can consist of a bank of Geiger-Muller counters. In this case, the detector is moved slowly over the surface to be monitored and close to this latter in such a manner as to ensure that the number of electric pulses delivered in proportion to the level of contamination of said surface and to the rate of displacement of the detector is sufficiently large to represent the true state of said contamination.

In the case of very large surfaces to be monitored, the method which consists in employing a detection probe coupled with a single measuring circuit in fact takes a long time since it calls for a relative speed of displacement of the detection probe and the surface being monitored which is of the order of one kilometer per hour or even less if it is desired to detect low levels of contamination over small portions of surface.

The present invention is directed to a method for detecting radioactive contamination of surfaces as well as a device for the practical application thereof which make it possible to circumvent the disadvantage noted above.

Accordingly, the aforesaid method for detecting the radioactive contamination of a surface is characterized in that it consists in sweeping each portion of said surface by means of a series of detectors in turn and in meauring and adding the radiations detected successively by each detector means over a same portion of surface.

The invention is also directed to a device for detecting the radioactive contamination of a surface and consisting of a series of equidistant radiation detectors disposed in at least one column and means for measuring radiations detected, characterized in that said device comprises means for sweeping at constant speed successive portions of said surface by means of said series of detectors and means for the summation of the radiations detected by each detector over a same portion of surface.

According to a preferred form of embodiment, the device is characterized in that said measuring means comprise a plurality of measuring circuits which are equal in number to the number of detectors of said column and connection means for coupling each of said detectors with each of said measuring circuits respectively, said connection means being provided with means for switching the connections at equal time intervals, each measuring circuit being coupled in turn with each successive detector of said column.

Reference being made to the accompanying FIGURES 1 and 2, the following description relates to a particular form of embodiment of the invention which is given solely by way of example and not in any limiting sense.

Figure 1:
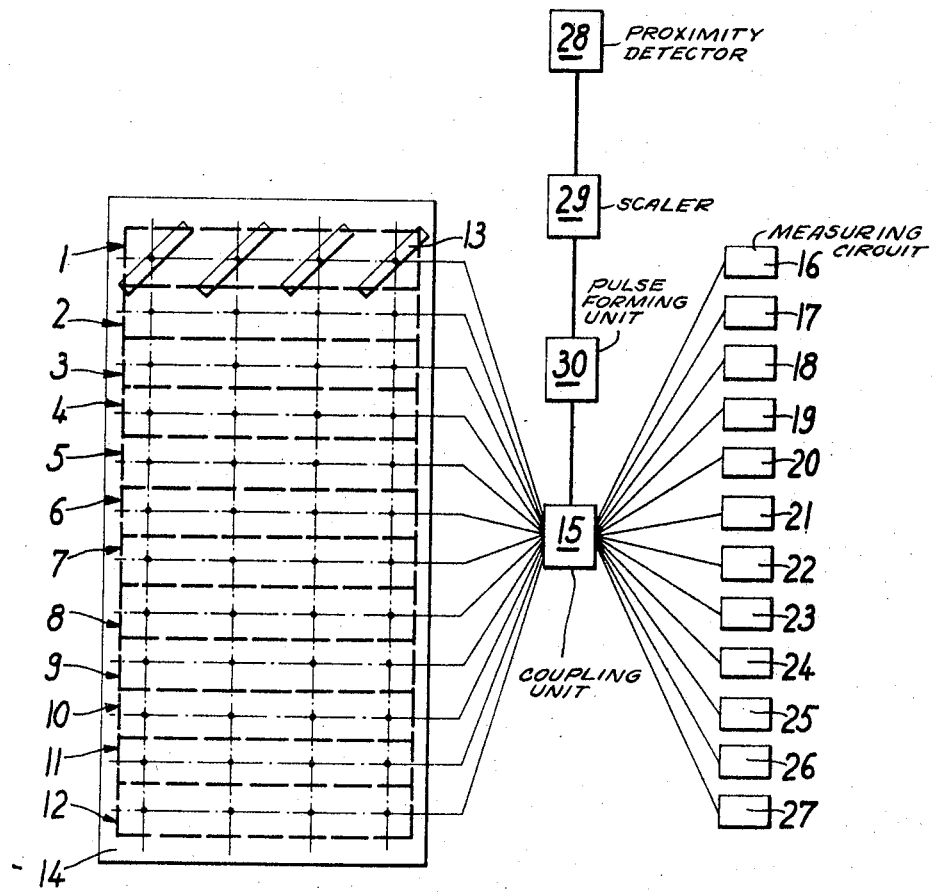
FIG. 1 is a general arrangement diagram of one form of embodiment of the device in accordance with the invention.

FIG. 1 shows a series of twelve detection probes numbered from 1 to 12. Said probes are each composed of four Geiger-Muller counters such as the counter 13 and are placed on a moving carriage or trolley 14 which is drawn at a constant speed over the surface under study. The axis of each counter is inclined at approximately 45° to the axis of the trolley 14 and their length is such as to provide a slight overlap of the surfaces swept by each counter during the movement of the trolley. The detection probes 1 to 12 are coupled by means of a coupling unit 15 with twelve measuring circuits numbered from 16 to 27 and shown alongside the trolley for the sake of clarity of FIG. 1. In the exemplified form of embodiment, said measuring circuits and the coupling unit are carried by the trolley. The switching of the detection probes to the measuring circuits is controlled from a proximity detector 28 which is coupled with the junction circuit 15 through a twelve-position scaler 29 and a pulse forming unit 30.

Figure 2:
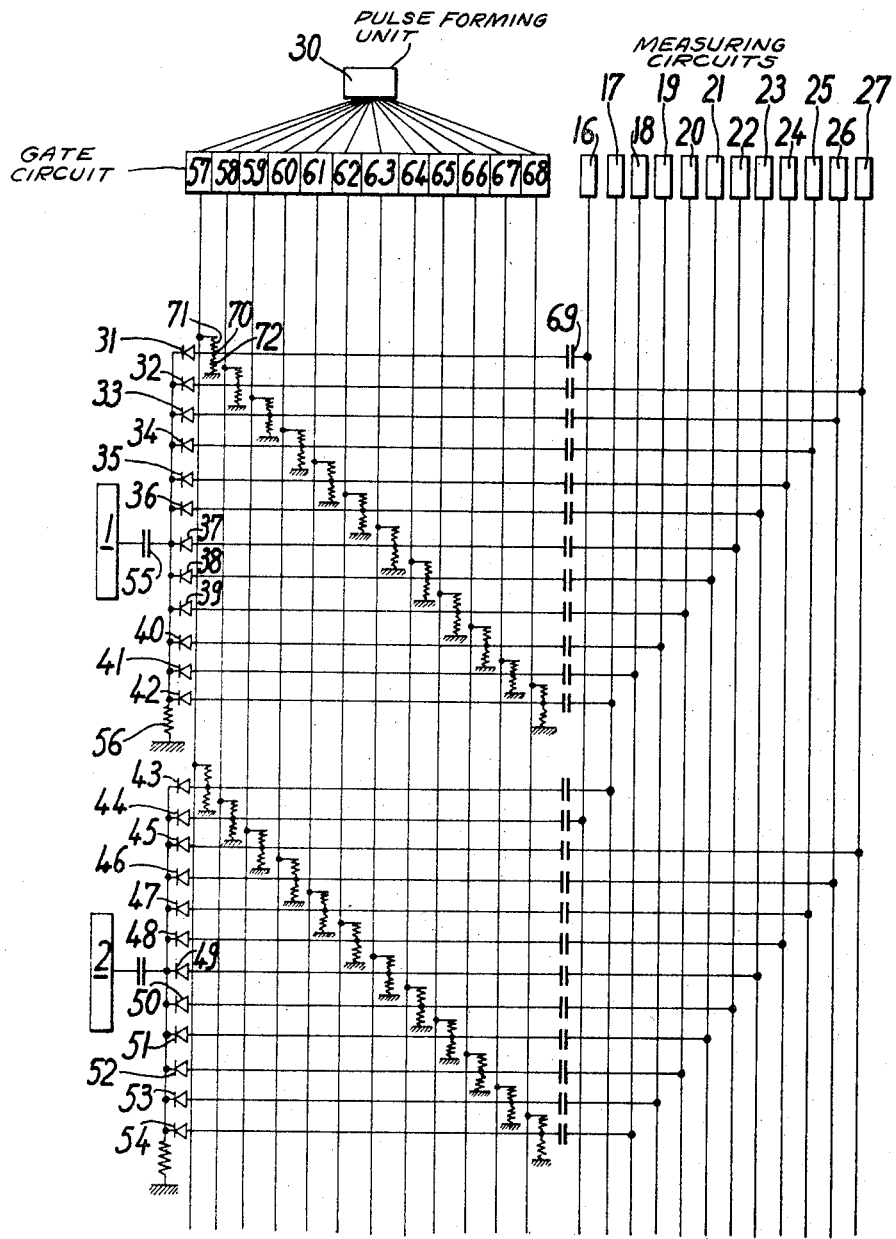
FIG. 2 is a schematic diagram of the unit which couples the detection probes with the measuring circuits.

FIG. 2 shows the junction circuit 15 for connecting the detection probes to the measuring circuits. Only two detection probes 1 and 2 have been shown in the drawings. Twelve diodes are connected with each detection probe. They are designated by the reference numerals 31 to 42 in the case of the detection probe 1 and by the reference numerals 43 to 54 in the case of the detection probe 2.

The cathodes of the diodes which correspond to each detection probe (probe 1 for example) are joined to each other and connected to the probe through a coupling capacitor 55 and to the frame (ground) through a resistor 56.

Twelve gate circuits 57 to 68 are connected to the pulse forming unit 30. Each of the twelve diodes connected with a detection probe is coupled on the one hand with one of the measuring circuits and, on the other hand, with one of the gate circuits. Thus, in FIG. 2, the anode of the diode 31 is connected to the measuring circuit 16 through a capacitor 69 and to a common point 70 of two resistors 71 and 72 which are connected in series between the gate circuit 57 and the frame (ground).

A diode of each group is connected with each gate circuit in the following manner:

The gate circuit 57 is connected with all of the first diodes of the respective probes and connects these latter respectively to the measuring circuit 16 (through the diode 31), to the circuit 17 (through the diode 43 in the case of probe 2), to the circuit 18 (through the first diode in the case of the third probe, and so forth in sequence). The gate circuit 58 is connected with the second diodes of each probe and connects each probe respectively to the circuit 27 (through the diode 32), to the circuit 16 (through the diode 44), to the circuit 17, and so forth in circular permutation.

Accordingly, the consecutive gate circuits of the junction circuit 15 make it possible to connect each of the detection probes 1 to 12 in turn to each of the measuring circuits 16 to 27 as will be explained in detail hereinafter.

In order to process the information to be derived from a fresh surface, each measuring circuit is reset to zero prior to connecting this latter with the detection probe 1.

A disc which is integral with one of the wheels of the trolley 14 is provided at its periphery with metallic screens which move past in front of the proximity detector 28 during the rotation of the wheel. The diameter of the disc, the number and arrangement of the screens are such that the proximity detector supplies a pulse each time the trolley 14 has moved over a distance equal to the interval between two adjacent detection probes (ten centimeters, for example). Said pulse causes the state of the scaler 29 to progress by one unit.

At the commencement of the monitoring operation, the detection probe 1 is connected to the measuring circuit 16, the detection probe 2 is connected to the measuring circuit 17 and so on up to the detection probe 12 which is connected to the measuring circuit 27: the scaler 29 occupies position "one" and, by means of the decoder 30, the gate circuit 57 applies a positive potential to the twelve diodes which are associated therewith and which each establish a connection between one of the detection probes and said gate 57. Out of the twelve diodes referred-to above, only two have been shown in the figure, namely the diodes 31 and 43: these latter are conductive and transmit the pulses delivered by the detection probe 1 to the measuring circuit 16 and the pulses delivered by the detection probe 2 to the measuring circuit 17 and so on in sequence. On the contrary, the gate circuits 58 to 68 transmit a negative potential, with the result that the corresponding diodes are polarized in opposite directions and do not transmit the pulses.

When the trolley 14 has moved forward over a distance of ten centimeters, a second pulse causes the scaler 29 to change over from position "one" to position "two." This time, the diodes which are connected to the gate circuit 58 are conductive whereas the diodes which are connected to the gate circuits 57, 59 . . . 68 are blocked. In this case, the diodes which are conductive transmit the pulses delivered by the detection probe 1 to the measuring circuit 27, the pulses delivered by the detection probe 2 to the measuring circuit and so on, the detection probe 12 being connected this time to the measuring circuit 26.

When the trolley 14 has moved forward again over a distance of ten centimeters, the measuring circuit 26 is coupled with the detection probe 1, the detection probe 2 to the measuring circuit 27, the detection probe 3 to the measuring circuit 27, the detection probe 3 to the measuring circuit 16, etc. up to the detection probe 12 which is coupled with the measuring circuit 25.

By virtue of the successive switching of the twelve detection probes to a single chain, the arrangement described above makes it possible to increase the speed of the trolley while at the same time retaining an acceptable observation time. Thus, since the total distance covered by the detection probes is 1.2 meters, if the complete assembly advances at a speed of two meters per second, each point of the ground is monitored for a total period of six tenths of one second. This monitoring period makes it possible to take a measurement to within twenty-five percent, provided that the number of pulses counted is at least equal to fifteen; this corresponds to a contamination which produces a count rate of twenty-five pulses per second.

Provision is made for an alarm system which emits a sound signal each time a predetermined threshold has been overstepped. This sound signal can be picked-up by the trolley driver by means of a headphone and must be maintained until the operator switches it off. The complete detection probe unit is covered with a thickness of five centimeters of lead divided into twelve plates. The trolley is drawn by a tractor which is fitted with a high-precision speed indicator and which is capable of traveling at speeds varying, for example, between five and eight kilometers per hour.

What is claimed is:

1. Device for detecting radioactive contamination of a surface comprising means for sweeping successive portions of the surface at constant speed by a series of equidistant detectors disposed in at least one column, means for cumulative measurement of radiations detected by each of the detectors of said column over a same portion of surface, measurement means comprising a plurality of measuring circuits equal in number to the number of detectors of said column, connection means for coupling each of said detectors with each of said measuring circuits respectively, said connection means including means for switching the connections at equal intervals of time, each measuring circuit being coupled in turn with each successive detector of said column, said measurement means further comprising means for resetting to zero after said switching means have been actuated a number of times equal to the number of detectors of said column.

2. Device as described in claim 1, including a series of diodes connecting each of said detectors to each of said measuring circuits and a polarization circuit connected to each of said diodes.

3. Device as described in claim 1, including a plurality of parallel identical columns of said detectors, said detectors in the same transverse row in the columns being coupled at each instant to the same measuring circuit.

References Cited

UNITED STATES PATENTS

| 3,234,386 | 2/1966 | Leventhal et al. | 250—83.3 |
| 3,270,205 | 8/1966 | Ladd et al. | 250—83.6 X |
| 3,278,747 | 10/1966 | Ohmart | 250—83.3 |
| 3,308,296 | 3/1967 | Cowan et al. | 250—71.5 |

RALPH G. NILSON, *Primary Examiner.*

SAUL ELBAUM, *Assistant Examiner.*

U.S. Cl. X.R.

250—83.3